(12) United States Patent
Allen

(10) Patent No.: US 7,611,185 B2
(45) Date of Patent: Nov. 3, 2009

(54) VEHICLE STRUCTURE

(75) Inventor: Diane Allen, Encinitas, CA (US)

(73) Assignee: Nissan Design America, Inc., San Diego, CA (US)

( * ) Notice: Subject to any disclaimer, the term of this patent is extended or adjusted under 35 U.S.C. 154(b) by 302 days.

(21) Appl. No.: 11/686,194

(22) Filed: Mar. 14, 2007

(65) Prior Publication Data

US 2008/0224461 A1    Sep. 18, 2008

(51) Int. Cl.
*B60R 9/00* (2006.01)
(52) U.S. Cl. .................. 296/37.6; 296/146.1; 222/192; 280/830
(58) Field of Classification Search ................. 296/156, 296/37.5, 37.1, 146.1, 1.07, 181.1, 183.1, 296/37.6; 222/192; 280/830
See application file for complete search history.

(56) References Cited

U.S. PATENT DOCUMENTS

| | | | |
|---|---|---|---|
| 5,730,360 A | 3/1998 | Wang | |
| 6,030,018 A | 2/2000 | Clare et al. | |
| 6,598,914 B1 | 7/2003 | Dixon | |
| 6,817,642 B1 * | 11/2004 | Warning | 296/1.07 |

FOREIGN PATENT DOCUMENTS

JP    2001-334887    12/2001

* cited by examiner

*Primary Examiner*—Lori L Lyjak
(74) *Attorney, Agent, or Firm*—Global IP Counselors, LLP

(57) ABSTRACT

A vehicle structure includes a vehicle body portion, a body panel and a fluid dispensing device. The body panel is coupled to the vehicle body portion to move between a closed position and an extended position. The fluid dispensing device is coupled to the body panel to move therewith when the body panel is moved to the closed position and when the body panel is moved to the extended position.

22 Claims, 6 Drawing Sheets

VEHICLE STRUCTURE

BACKGROUND OF THE INVENTION

1. Field of the Invention

The present invention relates to a vehicle structure that includes a fluid dispensing device. More specifically, the present invention relates to a vehicle structure that includes a fluid dispensing device that is concealed when not in use.

2. Background Information

Cargo space is limited in most vehicles regardless of whether the vehicle is used for commercial purposes or for family use. The demands placed upon the cargo space of a vehicle continue to expand whether the vehicle is for personal use or for job related activities. A common accessory for most vehicles is a cooler filled with water, especially in commercial vehicles where a worker continually needs to replenish fluids or needs to wash hands. Such coolers take up valuable cargo space.

Many commercial vehicles are provided with an air compressor installed after market in order to power pneumatic tools on a job site. A problem with such after market air compressors is that the air compressor and corresponding air hoses typically take up valuable cargo space.

In view of the above, it will be apparent to those skilled in the art from this disclosure that there exists a need for an improved fluid dispensing arrangement that takes coolers and air compressors out of cargo areas, freeing up the space in the cargo area. This invention addresses this need in the art as well as other needs, which will become apparent to those skilled in the art from this disclosure.

SUMMARY OF THE INVENTION

One object of the present invention is to provide a vehicle with a fluid dispensing device that is easily accessed and does not interfere with the use of cargo space.

Another object of the present invention is to provide a water dispensing device within the structure of a vehicle.

Yet another object of the present invention is to provide a compressed air dispensing device within the structure of a vehicle.

In accordance with one aspect of the present invention, a vehicle structure includes a vehicle body portion, a body panel and a fluid dispensing device. The body panel is coupled to the vehicle body portion to move between a closed position and an extended position. The fluid dispensing device is coupled to the body panel to move therewith when the body panel is moved to the closed position and when the body panel is moved to the extended position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
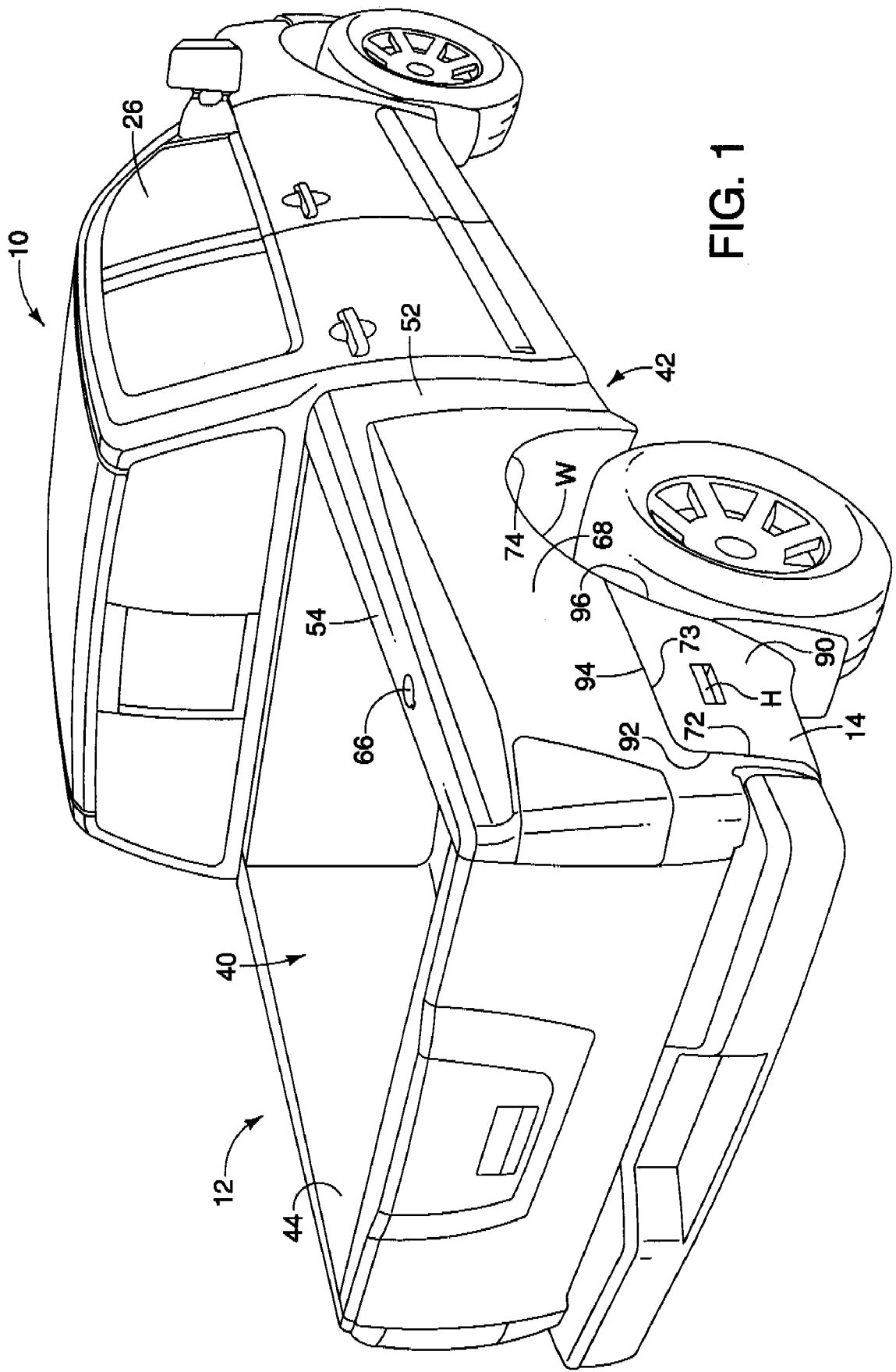
FIG. 1 is a perspective view of a vehicle showing a side wall structure of a cargo area of the vehicle having a movable body panel oriented in a closed position in accordance with one embodiment of the present invention.
Figure 2:
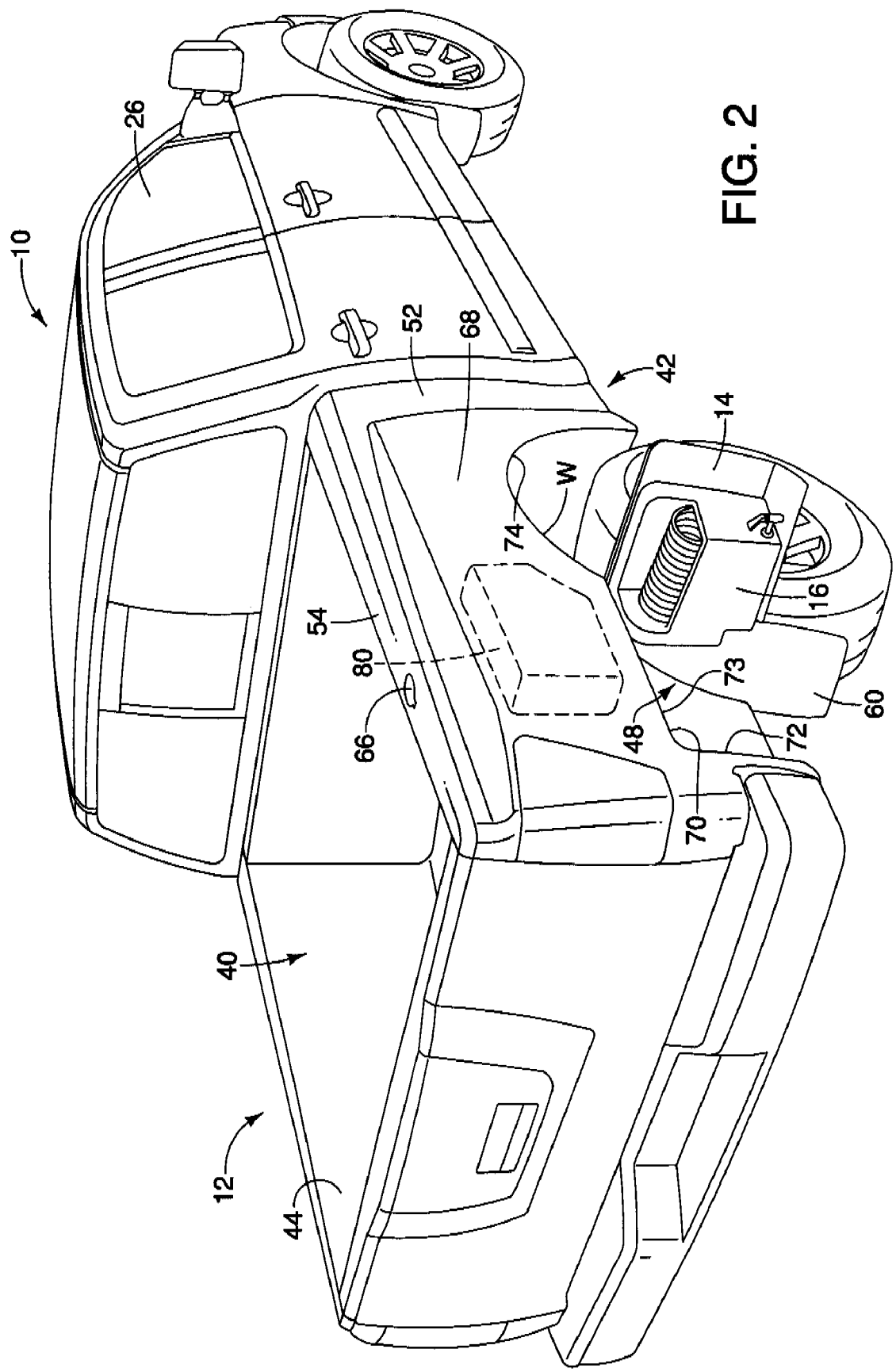
FIG. 2 is another perspective view of the vehicle showing the body panel in an extended position revealing a fluid dispensing device that is coupled to move with the body panel in accordance with one embodiment of the present invention.
Figure 3:
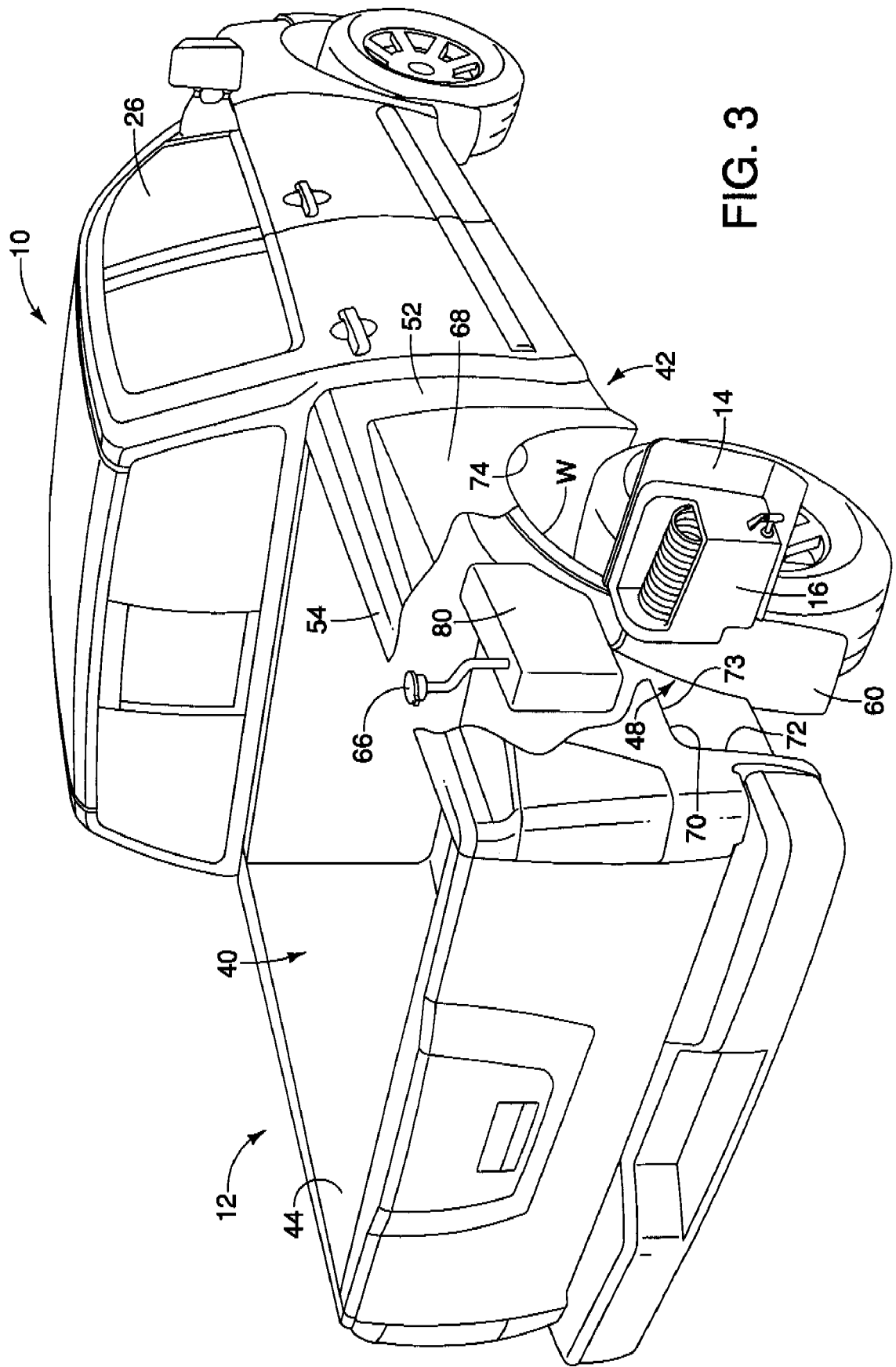
FIG. 3 is another perspective view similar to FIG. 2 showing the body panel in the extended position and showing the side wall structure cut away to reveal a water storage tank fluidly connected to the fluid dispensing device in accordance with one embodiment of the present invention.

Referring initially to FIGS. 1, 2 and 3, a vehicle 10 is illustrated in accordance with a first embodiment of the present invention. The vehicle 10 includes a vehicle body portion 12 that has a body panel 14 with a fluid dispensing device 16 (shown in FIGS. 2 and 3) supported thereon. As described in greater detail below, the body panel 14 is configured to move between a closed position shown in FIG. 1 and an extended position shown in FIGS. 2 and 3. With the body panel 14 in the closed position (FIG. 1), the fluid dispensing device 16 is concealed. With the body panel 14 in the extended position, the fluid dispensing device 16 is in a fluid dispensing orientation such that a person can dispense water or compressed air, as described in greater detail below.

Figure 4:
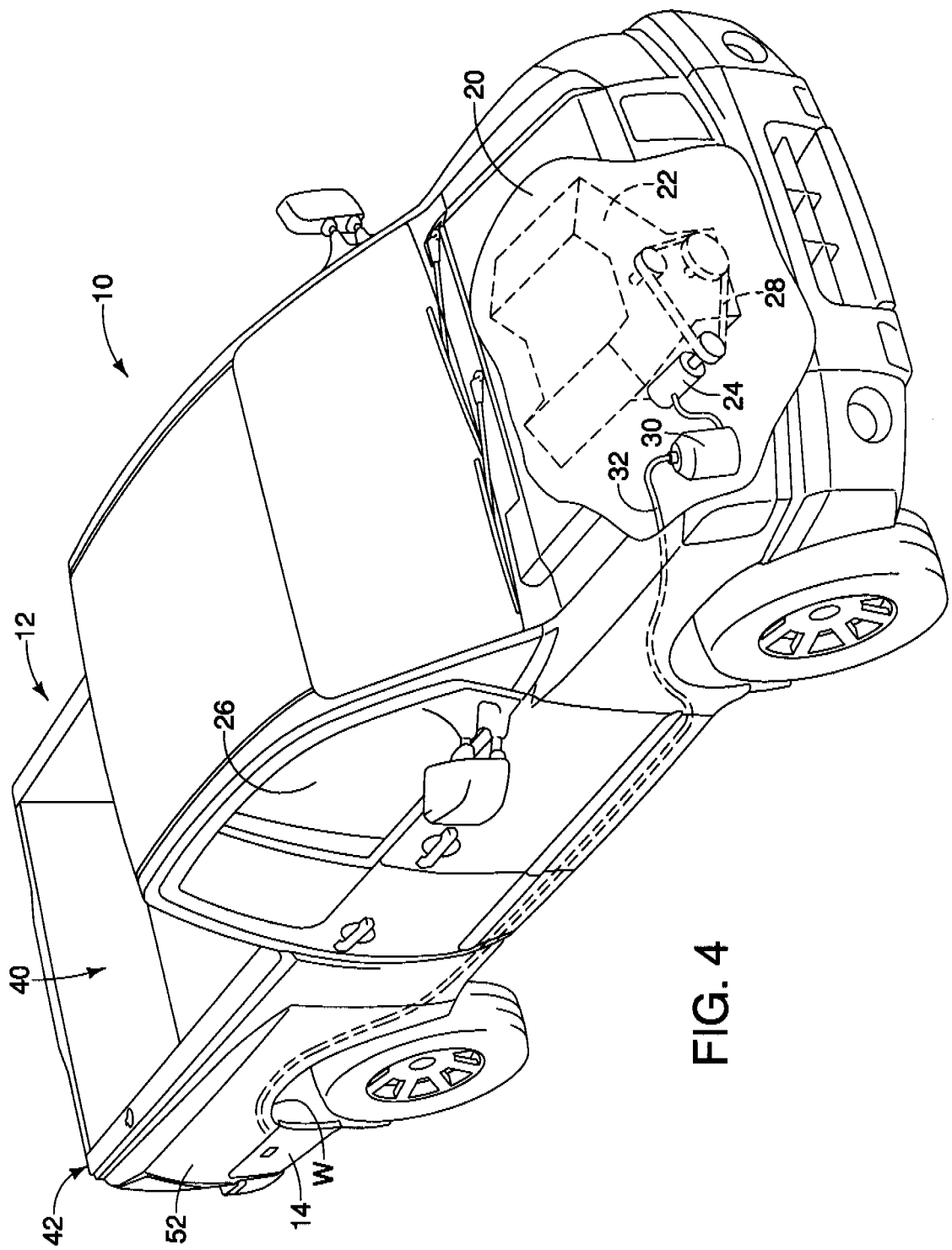
FIG. 4 is another perspective view of the vehicle shown in FIGS. 1-3 from a different angle, showing an engine compartment with an engine and an air compressor fluidly connected to the fluid dispensing device in accordance with one embodiment of the present invention.

A brief description of the vehicle 10 is now provided with reference to FIG. 4. Specifically, the description of the vehicle 10 provided below includes mainly those features that are peripherally or directly related to the present invention. Conventional features of the vehicle 10, for instance, suspension, steering, fuel, electrical system, etc., will be omitted for the sake of brevity. Among other things, the vehicle 10 includes an engine compartment 20, an engine 22, an air compressor 24, a passenger compartment 26 and the vehicle body portion 12.

The engine compartment 20 is preferably located at the front of the vehicle 10 and houses the engine 22. However, it should be understood from the drawings and the description herein that the present invention can be applied to vehicles other that the depicted vehicle 10 where the engine compartment 20 is positioned at a location other than the front of the vehicle. The engine 22 is preferably an internal combustion engine (gas or diesel), but can alternatively be part of a hybrid system, fuel cell system or electric engine system.

The air compressor 24 is preferably mounted on and powered by the engine 22 by, for example, a belt 28. The air compressor 24 is fluidly connected to a reservoir 30 that provides storage for compressed air. The air compressor 24 and reservoir 30 are conventional components that include one way valves and other features common to an air compressor and compressed air delivery system. Therefore, further description of those features is omitted for the sake of brevity. The air compressor 24 is disposed within the vehicle 10 remote from the fluid dispensing device 16. The air compressor 24 includes a hose, tube or line 32 (a supply line) suitable for delivering compressed air. The line 32 is fluidly connected between the reservoir 30 and the fluid dispensing device 16 to supply compressed air to fluid dispensing device.

The line 32 extends under the passenger compartment 26 and through the vehicle body portion 12. However, it should be understood that the exact location of the line 32 can vary from vehicle to vehicle. In other words, the depicted location of the line 32 is not a critical feature of the present invention. Specifically, the line 32 can be located in any of a variety of convenient places within the vehicle 10, under the vehicle 10 or outside the vehicle 10 as long as the line 32 can deliver compressed air from the reservoir 30 (and the compressor 24) to the fluid dispensing device 16.

Figure 5:
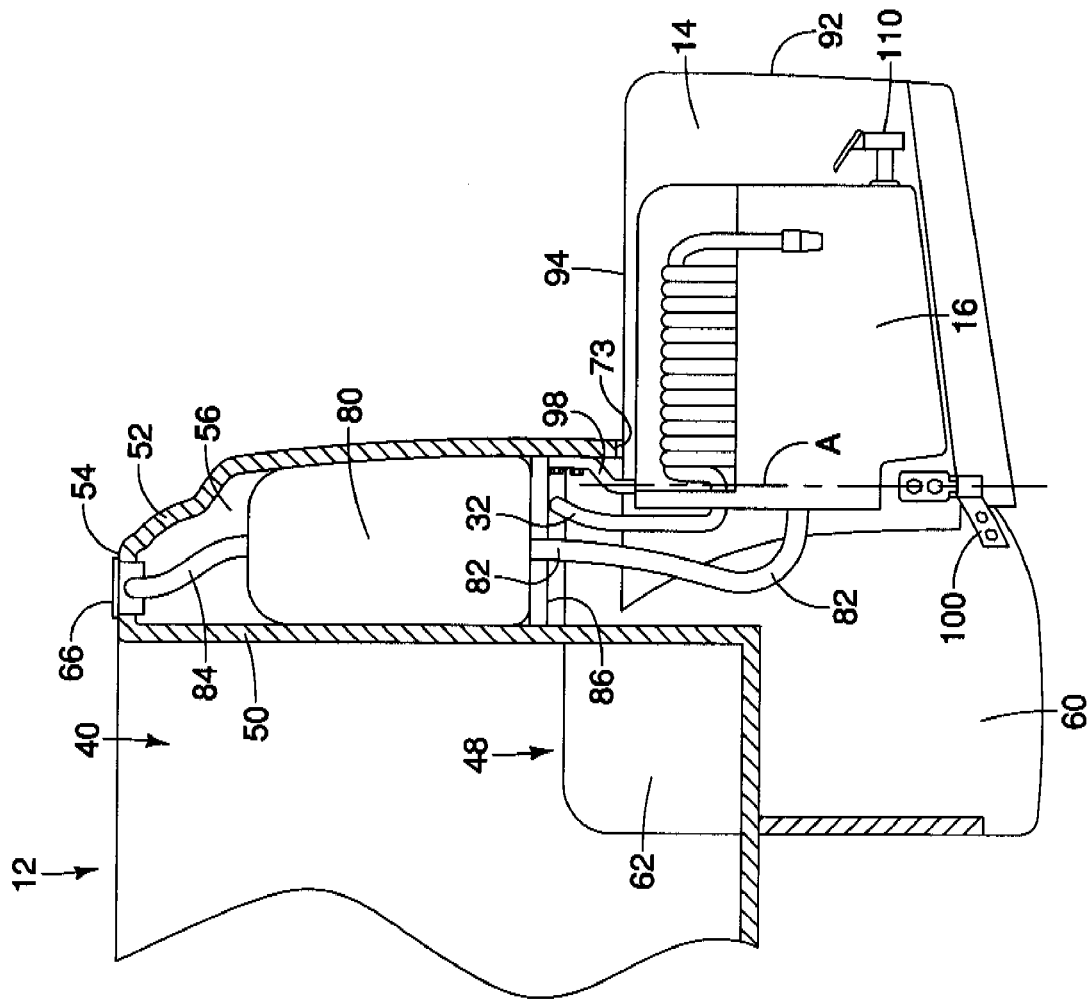
FIG. 5 is a cross-sectional view of the side wall structure with the body panel in the open position showing details of the water storage tank and the fluid dispensing device in accordance with one embodiment of the present invention.

A description of the vehicle body portion 12 is now provided with specific reference to FIGS. 2, 3 and 5. The vehicle body portion 12 is preferably a cargo bed of a pickup truck or similar vehicle that includes a cargo area 40. The cargo area 40 is at least partially defined by a first side wall structure 42 and a second side wall structure 44. The first and second side wall structures 42 and 44 also at least partially defining an open upper end of the cargo area 40 (a cargo box). The cargo area 40 is located between the first and second side wall structures 42 and 44 behind the passenger compartment 26.

The following description focuses on the first side wall structure 42. However, it should be understood from the drawings and the description herein, that the body panel 14 and the fluid dispensing device 16 can be installed in either of the first and second side wall structures 42 and 44. For the sake of brevity, description is directed to the first side wall structure 42 but also alternatively applies to the second side wall structure 44.

The first side wall structure 42 of the vehicle body portion 12 includes a wheel well structure 48, an inner body panel 50, an outer body panel 52 (a main body panel), an upper surface 54 and a hollow interior portion 56.

As shown in FIG. 5, the wheel well structure 48 includes an arcuate shaped liner 60 and an upward projection 62 that extends into the cargo area 40. The liner 60, the inner body panel 50, the outer body panel 52 and the upper surface 54 at least partially confine and form the hollow interior portion 56. The upper surface 54 of the first side wall structure 42 of the vehicle body portion 12 includes a filler tube opening 66, as best shown in FIG. 2.

As best shown in FIGS. 2 and 3, the outer body panel 52 includes an outer surface 68, an opening 70, a first edge 72, a second edge 73 and a curved edge 74. The outer surface 68 of the outer body panel 52 has a contoured shape. The first and second edges 72 and 73 at least partially define the opening 70. The opening 70 provides access to the hollow interior portion 56. The curved edge 74 at least partially defines the shape of a wheel well W.

Figure 6:
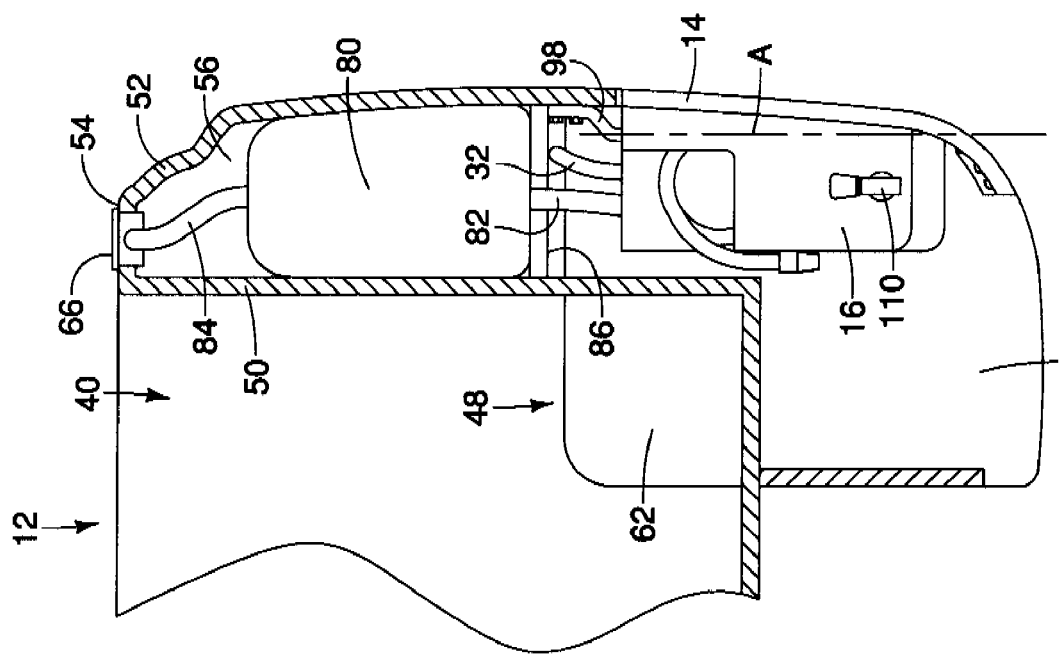
FIG. 6 is another cross-sectional view of the side wall structure similar to FIG. 5 showing the body panel in the closed position in accordance with one embodiment of the present invention.

As best shown in FIG. 6, the hollow interior portion 56 of the first side wall structure 42 is dimensioned such that with the body panel 14 in the closed position, the fluid dispensing device 16 is disposed within the hollow interior portion 56.

As best shown in FIGS. 2, 3 and 5, a water storage tank 80 is disposed within the hollow interior portion 56 of the first side wall structure 42 of the vehicle body portion 12 remote from the fluid dispensing device 16. The water storage tank 80 includes a fluid supply line 82 and a filler tube 84. The fluid supply line 82 fluidly connects the water storage tank 80 to fluid dispensing device 16. The filler tube 84 extends from the water storage tank 80 to the filler tube opening 66. The water storage tank 80 is retained within the hollow interior portion 56 by fasteners (not shown) and supported underneath by the liner 60, a support plate 86 fixed to both the inner body panel 50 and the outer body panel 52. The water storage tank 80 is fixedly coupled to the first side wall structure 42 within the hollow interior portion 56 at a location higher than the fluid dispensing device 16.

The body panel 14 is pivotally coupled to the vehicle body portion 12 to move between a closed position shown in FIG. 1 and an extended position shown in FIG. 2. The body panel 14 basically serves as an access door that manually opens and closes.

The body panel 14 is dimensioned to cover the opening 70 in outer body panel 52 of the vehicle body portion 12. Specifically, the body panel 14 covers the opening 70 in the closed position (FIG. 1) concealing the hollow interior portion 56. In the open position (FIG. 2), the body panel 14 provides access to the hollow interior portion 56 and the fluid dispensing device 16.

Figure 7:
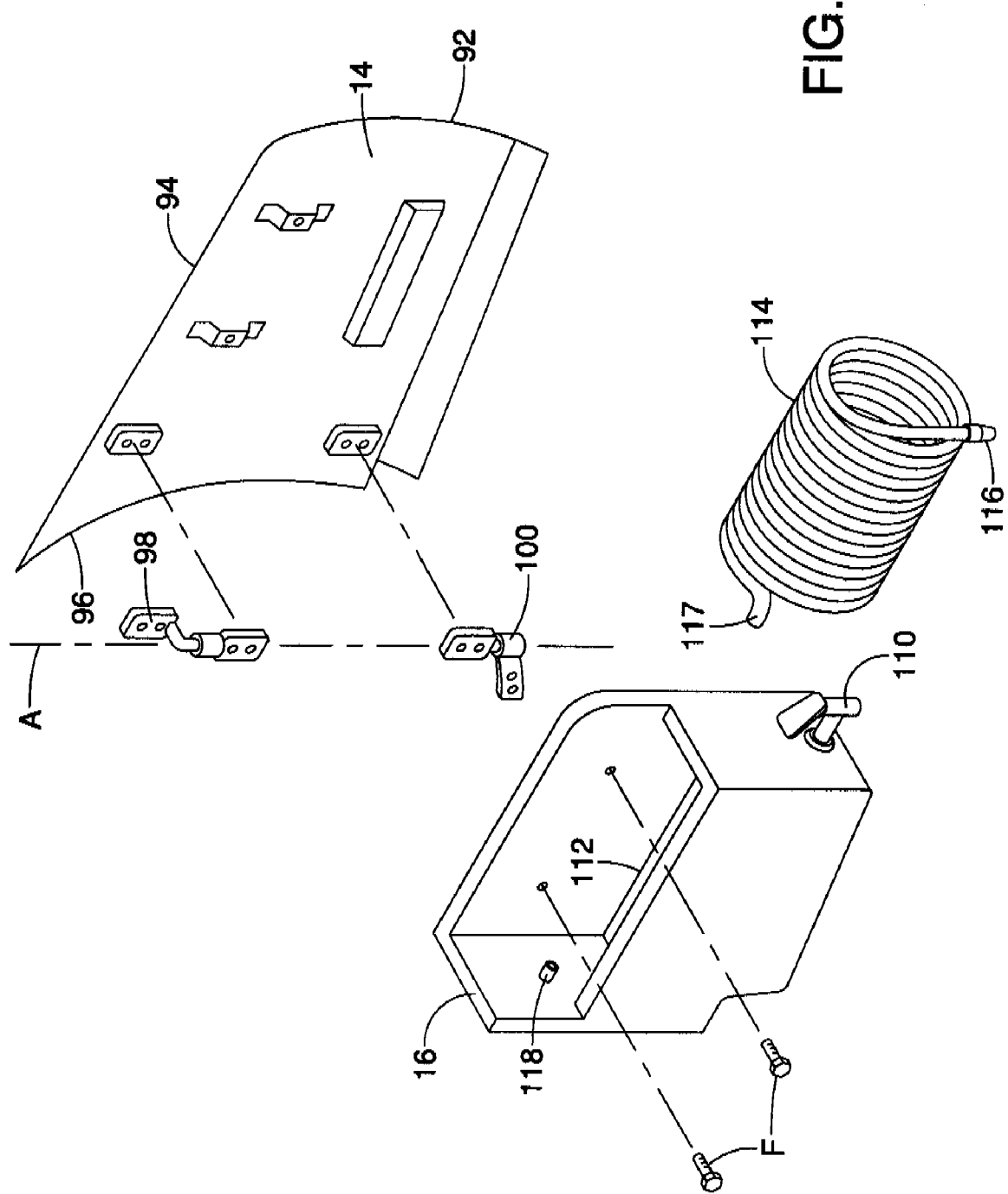
FIG. 7 is an exploded view of the body panel removed from the vehicle showing details of the body panel and the fluid dispensing device in accordance with one embodiment of the present invention.

As best shown in FIGS. 1 and 7, the body panel 14 includes an outer surface 90 (FIG. 1 only), a third edge 92, a fourth edge 94 and a curved edge 96. The outer surface 90 has a contoured shape that conforms to the contoured shape of the outer surface 68 of the outer body panel 52. More specifically, when the body panel 14 is in the closed position shown in FIG. 1, the body panel 14 and the outer body panel 52 conform to the overall shape of the vehicle body portion 12. When viewed from a distance, the body panel 14 and the outer body panel 52 appear to be one piece. The outer surface 90 can optionally include a handle H, as shown in FIG. 1.

In order to maintain the overall appearance of the vehicle body portion 12, the third edge 92 conforms in shape and contour to the shape and contour of the first edge 72 of the outer body panel 52. Specifically, the third edge 92 extends along the first edge 72 when the body panel 14 is in the closed position. Further, the third edge 92 moves outward and away from the first edge 72 when the body panel 14 is moved from the closed position (FIG. 1) to the extended position (FIG. 2).

The fourth edge 94 of the body panel 14 conforms in shape and contour to the shape and contour of the second edge 73 of the outer body panel 52. Specifically, the fourth edge 94 extends along the second edge 73 when the body panel 14 is in the closed position.

The curved edge 96 of the body panel 14 is shaped to continue the curved contour of the curved edge 74 of the outer body panel 52. Specifically, the curved edge 96 of the body panel 14 and the curved edge 74 of the outer body panel 52 at least partially defining the wheel well W of the vehicle body portion. Further, the curved edge 96 of the body panel 14 defines a rear portion of the wheel well W.

The body panel 14 is movably supported to the vehicle body portion 12 for movement about a generally vertical axis A shown in FIGS. 6 and 7. More specifically, the body panel 14 is pivotally mounted to the vehicle body portion 12 by a pair of hinges 98 and 100. The hinge 98 is mounted to an inner side of the outer body panel 52 within the hollow interior portion 56 and an upper region of an inner side of the body panel 14, as indicated in FIG. 5. The hinge 100 is mounted to a lower region of the inner side of the body panel 14 and an outer region of the arcuate shaped liner 60 of the wheel well structure 48, as also indicated in FIG. 5.

It should be understood from the drawings and the description herein that the specific location and type of hinge configuration used to mount the body panel 14 to the vehicle body portion 12 is variable depending upon vehicle design considerations such as size of the vehicle and actual location of the body panel 14 and the fluid dispensing device 16. In other words, the depicted design and location of the hinges 98 and 100 is only one example of a pivoting structure that can be used with the present invention. The present invention is not limited to the depicted hinge structure of the hinges 98 and 100.

A description of the fluid dispensing device 16 is now provided with specific reference to FIGS. 5 and 7. The fluid dispensing device 16 is coupled to the body panel 14 to move therewith when the body panel 14 is moved to the closed position and when the body panel 14 is moved to the extended position. The fluid dispensing device 16 is preferably mounted to the body panel 14 by fasteners F, as indicated in FIG. 7. Alternatively, the body panel 14 can be provided with dovetail-like channels (not shown) and the fluid dispensing device 16 provided with dovetail-like projections (not shown) that slide in and out of the dovetail-like channels of the body panel 14.

The fluid dispensing device 16 is basically a box-like member that includes a water spigot 110, an air hose tray 112 and an air hose 114. The water spigot 110 is fixed to one side of the fluid dispensing device 16 adjacent to the third edge 92 of the body panel 14. The water spigot 110 is fluidly connected to the water storage tank 80 by the fluid supply line 82, as shown in FIG. 5. Since the water storage tank 80 is fixedly coupled to the first side wall structure 42 within the hollow interior portion 56 at a location higher than the water spigot 110, water is gravity fed from the water storage tank 80 to the water spigot 110. Although not shown, the fluid dispensing device 16 can optionally include a hollow interior that can receive a predetermined amount of water and act as a secondary reservoir.

The air hose tray 112 is provided along an upper portion of the fluid dispensing device 16. The air hose tray 112 is basically a recess or shelf formed in the fluid dispensing device 16. The air hose 114 includes a dispensing end 116 that includes an air tool connecting chuck and a connection end 117 that connects to an air fitting 118. The fitting 118 is fluidly connected to the line 32. The air compressor 24 is disposed within the vehicle 10 remote from the fluid dispensing device 16. However, the line 32 fluidly connects the air compressor 24 to the air hose 114 of the fluid dispensing device 16.

The fluid dispensing device 16 can optionally be provided with an air tool storage compartment (not shown) under the air hose tray 112.

The various components of the vehicle 10 are conventional components that are well known in the art. Since vehicles such as pickup trucks are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle structure comprising:
    a vehicle body portion that includes a main body panel having an outer surface with a first contoured shape;
    a body panel coupled to the vehicle body portion to move between a closed position and an extended position, the body panel having an outer surface with a second contoured shape, the first and second contoured shapes conforming to one another to at least partially define an outer body shape of the vehicle body portion; and
    a fluid dispensing device coupled to the body panel to move therewith when the body panel is moved to the closed position and when the body panel is moved to the extended position.

2. The vehicle structure according to claim 1, wherein
    the vehicle body portion includes a hollow interior portion accessible via an opening in the vehicle body portion, and
    the body panel is dimensioned to cover the opening in the closed position concealing the hollow interior portion.

3. The vehicle structure according to claim 2, wherein
    the main body panel of the vehicle body portion has a first edge that at least partially defines the opening, and
    the body panel includes a second edge that extends along the first edge with the body panel in the closed position, and the second edge moves outward and away from the first edge when the body panel is moved from the closed position to the extended position.

4. The vehicle structure according to claim 1, wherein
   the main body panel of the vehicle body portion has a first curved edge, and
   the body panel includes a second curved edge, the first and second curved edges at least partially defining a wheel well of the vehicle body portion.

5. The vehicle structure according to claim 4, wherein the second curved edge of the body panel defines a rear portion of the wheel well.

6. The vehicle structure according to claim 1, wherein the vehicle body portion is a cargo bed of a pickup truck.

7. The vehicle structure according to claim 1, wherein
   the main body panel of the vehicle body portion has a first edge, and
   the body panel includes a second edge that extends along the first edge with the body panel in the closed position, and the second edge moves outward and away from the first edge when the body panel is moved from the closed position to the extended position.

8. The vehicle structure according to claim 7, wherein
   the main body panel includes a first curved edge, and
   the body panel includes a second curved edge, the first and second curved edges at least partially defining a wheel well of the vehicle body portion.

9. The vehicle structure according to claim 1, wherein the fluid dispensing device includes a water spigot.

10. The vehicle structure according to claim 9, wherein the fluid dispensing device includes a compressed air hose with a dispensing end.

11. The vehicle structure according to claim 9, further comprising:
    a water storage tank fixedly coupled to the vehicle structure at a location higher than the water spigot, the water storage tank including a fluid supply line fluidly connected to the fluid dispensing device.

12. The vehicle structure according to claim 1, wherein
    the vehicle body portion includes a cargo area having a first side wall structure and a second side wall structure at least partially defining an open upper end of a cargo box, the cargo area being located between the first and second side wall structures, one of the first and second side wall structures having a hollow interior portion dimensioned such that with the body panel in the closed position, the fluid dispensing device is disposed within the hollow interior portion.

13. A vehicle structure comprising:
    a vehicle body portion;
    a body panel coupled to the vehicle body portion to move between a closed position and an extended position, the body panel being movably supported to the vehicle body portion for movement about a generally vertical axis; and
    a fluid dispensing device coupled to the body panel to move therewith when the body panel is moved to the closed position and when the body panel is moved to the extended position.

14. The vehicle structure according to claim 13, wherein
    the vehicle body portion includes a main body panel having an outer surface with a first contoured shape, and
    the body panel has an outer surface with a second contoured shape, the first and second contoured shapes conforming to one another to at least partially define an outer body shape of the vehicle body portion.

15. A vehicle structure comprising:
    a vehicle body portion;
    a body panel coupled to the vehicle body portion to move between a closed position and an extended position;
    a fluid dispensing device coupled to the body panel to move therewith when the body panel is moved to the closed position and when the body panel is moved to the extended position; and
    a water storage tank disposed within the vehicle body portion remote from the fluid dispensing device, the water storage tank including a fluid supply line fluidly connected to fluid dispensing device, the fluid dispensing device including a water spigot.

16. The vehicle structure according to claim 15, wherein the water storage tank is disposed within a hollow interior portion of the vehicle body portion.

17. The vehicle structure according to claim 16, wherein
    the vehicle body portion includes an upper portion having a filler tube opening, and
    the water storage tank includes a filler tube that extends from the water storage tank to the filler tube opening.

18. The vehicle structure according to claim 15, wherein
    the vehicle body portion includes a main body panel having an outer surface with a first contoured shape, and
    the body panel has an outer surface with a second contoured shape, the first and second contoured shapes conforming to one another to at least partially define an outer body shape of the vehicle body portion.

19. A vehicle structure comprising:
    a vehicle body portion;
    a body panel coupled to the vehicle body portion to move between a closed position and an extended position; and
    a fluid dispensing device coupled to the body panel to move therewith when the body panel is moved to the closed position and when the body panel is moved to the extended position, the fluid dispensing device including a compressed air hose with a dispensing end.

20. The vehicle structure according to claim 19, further comprising:
    an air compressor disposed within the vehicle structure remote from the fluid dispensing device, the air compressor including a supply line fluidly connected to fluid dispensing device.

21. The vehicle structure according to claim 20, wherein the air compressor is disposed within an engine compartment of the vehicle structure.

22. The vehicle structure according to claim 20, wherein the air compressor is operably powered by an internal combustion engine disposed within the vehicle structure.

* * * * *